United States Patent
Nguy et al.

(10) Patent No.: US 7,280,807 B2
(45) Date of Patent: Oct. 9, 2007

(54) INITIATOR DEVICE CAPABLE OF TWO-WAY HALF-DUPLEX COMMUNICATION WITH MULTIPLE RECIPIENT DEVICES

(76) Inventors: Samuel Eak Hua Nguy, Suite 2801, Universal Trade Centre, 3-5A Arbuthnot Road Central, Hong Kong (CN); George Carl Atamian, 2315 N. Laurel Ave., Upland, CA (US) 91784

( * ) Notice: Subject to any disclaimer, the term of this patent is extended or adjusted under 35 U.S.C. 154(b) by 330 days.

(21) Appl. No.: 10/757,019

(22) Filed: Jan. 14, 2004

(65) Prior Publication Data
US 2005/0153666 A1 Jul. 14, 2005

(51) Int. Cl.
*H04B 1/38* (2006.01)
(52) U.S. Cl. .......... 455/90.2; 455/90.3; 455/3.05; 455/75; 455/77; 455/417; 455/462; 455/519; 455/520; 455/521; 370/296; 370/277; 370/313; 375/219
(58) Field of Classification Search .......... 455/90.2, 455/90.3, 73, 75, 77, 417, 462, 518, 519, 455/520, 521, 569.1, 3.05; 375/219; 340/825; 370/296, 276, 277, 313
See application file for complete search history.

(56) References Cited

U.S. PATENT DOCUMENTS

| | | | |
|---|---|---|---|
| 3,939,418 A | 2/1976 | Morrison et al. | |
| 4,903,298 A * | 2/1990 | Cline | 380/270 |
| 5,276,916 A | 1/1994 | Pawlish et al. | |
| 5,309,502 A | 5/1994 | Hirai | |
| 5,533,099 A | 7/1996 | Byrne | |
| 5,590,399 A | 12/1996 | Matsumoto et al. | |
| 5,852,784 A | 12/1998 | Ito et al. | |
| 5,912,931 A | 6/1999 | Matsumoto et al. | |
| 5,953,661 A | 9/1999 | Schwinghammer et al. | |
| 5,987,334 A | 11/1999 | Kaku | |
| 5,999,823 A | 12/1999 | Yoneyama et al. | |
| 6,009,323 A | 12/1999 | Heffield et al. | |
| 6,044,267 A | 3/2000 | Foladare et al. | |
| 6,091,329 A * | 7/2000 | Newman | 340/539.15 |
| 6,144,848 A * | 11/2000 | Walsh et al. | 455/419 |
| 6,163,680 A * | 12/2000 | Bridle et al. | 340/825.2 |
| 6,215,474 B1 | 4/2001 | Shah | |
| 6,219,545 B1 | 4/2001 | Hall | |
| 6,243,573 B1 * | 6/2001 | Jacklin | 455/416 |
| 6,256,491 B1 * | 7/2001 | Ehlers et al. | 455/410 |
| 6,272,331 B1 | 8/2001 | Mirabelli | |
| 6,321,095 B1 * | 11/2001 | Gavette | 455/517 |
| 6,351,653 B1 | 2/2002 | Alberth, Jr. et al. | |
| 6,374,091 B1 | 4/2002 | Richards et al. | |
| 6,415,158 B1 | 7/2002 | King et al. | |
| 6,463,304 B2 * | 10/2002 | Smethers | 455/566 |

(Continued)

*Primary Examiner*—Matthew D. Anderson
*Assistant Examiner*—Shaima Q. Aminzay
(74) *Attorney, Agent, or Firm*—Snell & Wilmer L.L.P.

(57) ABSTRACT

An initiator transceiver for operating in a two-way half-duplex communication mode with multiple recipient transceivers. The transceivers includes a body having a cavity and a control device, positioned within the cavity, for receiving a recipient identification code that identifies a remote transceiver and for transmitting an initiator identification code and the recipient identification code to the remote transceiver. The control device scans a plurality of channels for a signal or interference and designates a first available channel as a primary channel and a second available channel as a standby channel.

24 Claims, 7 Drawing Sheets

U.S. PATENT DOCUMENTS

| | | |
|---|---|---|
| 7,076,209 B2 * | 7/2006 | Sugikawa et al. ......... 455/41.2 |
| 2001/0029191 A1 | 10/2001 | Wilhelm |
| 2002/0006806 A1 | 1/2002 | Kinnunen et al. |
| 2002/0119792 A1 | 8/2002 | Silvestri |
| 2002/0132635 A1 | 9/2002 | Girard et al. |
| 2002/0198020 A1 | 12/2002 | Mooney |
| 2004/0116073 A1 * | 6/2004 | Mauney et al. ............ 455/41.2 |
| 2004/0209569 A1 * | 10/2004 | Heinonen et al. .......... 455/41.2 |

* cited by examiner

INITIATOR DEVICE CAPABLE OF TWO-WAY HALF-DUPLEX COMMUNICATION WITH MULTIPLE RECIPIENT DEVICES

BACKGROUND OF THE INVENTION

1. Field of the Invention

The invention relates generally to devices and methods for providing low-cost, low-power, secure voice communications, and more particularly to devices and methods for providing direct secure voice communication between an initiator device and one or more recipient devices without the use of an intermediate network.

2. Description of the Related Art

Handheld radio transceivers (e.g., walki talkies) have existed for many years and have provided communication amongst multiple users on the premises of construction sites, factories, warehouses and other facilities. These radio transceivers include a memory that may be loaded with a predetermined sequence or listing of channel and sub-channel codes to provide selective calling operations. The sub-channel can be referred to as digital coded squelch (DCS) or continuous tone-coded squelch system (CTCSS), which are a set of codes that are programmed into each radio transceiver so that multiple radio transceivers with the same code can communicate with each other. For example, two different transceivers can be manually set to channel 5 and sub-channel 17, thus allowing the two transceivers the ability to communicate with each other. Once the transceivers are set to the same channel and sub-channel, one user can press the push-to-talk (PTT) button to begin communication with the other user.

The number of communication channels available, however, is necessarily limited by the number of frequencies allotted for use by the Federal Communications Commission (FCC). For example, the FCC has allotted only 14 channels to consumers to operate two-way radio products without a radio license (sometimes referred to as the Family Radio Service (FRS)).

One drawback of conventional transceivers is their inability to provide private communications when multiple users are communicating in a densely populated area. Therefore, if multiple users are in the same area, it maybe difficult for the users to select an available secure channel for communication. Another drawback of conventional transceivers is the inability to switch the transceivers to another channel during interference. For example, if two transceivers are on channel 4, sub-channel 26 and interference occurs preventing the users from communicating, the users will not be able to switch to the same channel because they are unable to communicate that information to each other. That is, one user must be able to notify the other user of the channel to switch to. Thus, the problem of reconnecting to another channel exists.

Thus, it should be appreciated that there is a need for low-cost, low-power and secure devices and methods that allow multiple users the ability to communicate with one another while preventing third parties within the specified range from listening to the conversation. The invention fulfills this need as well as others.

SUMMARY OF THE INVENTION

In one embodiment, the invention is a transceiver configured to operate on a half-duplex mode. The transceiver may include a body having a cavity and a control device, positioned within the cavity, for receiving a recipient identification code that identifies a remote transceiver and for transmitting an initiator identification code and the recipient identification code to the remote transceiver. The control device scans a plurality of channels for a signal or interference and designates a first available channel as a primary channel and a second available channel as a standby channel.

In one embodiment, the invention is a method for establishing two-way communication between an initiator device and a recipient device. The method may include transmitting call initiate information having a recipient identification code from the initiator device to a plurality of active devices, each of the plurality of active devices having an identification code, determining whether the recipient identification code is identical to the identification code of each of the plurality of active devices, receiving acknowledgement information from a plurality of recipient devices selected from the plurality of active devices that has an identification code that is identical to the recipient identification code and transmitting voice data from the initiator device to the plurality of recipient devices.

In one embodiment, the invention is a method for establishing a secure direct connection between an initiator transceiver and a plurality of recipient transceivers without the use of a telephone network. The method may include transmitting via a primary channel call initiate information having a recipient identification code from the initiator transceiver to the plurality of recipient transceivers, each of the plurality of recipient transceivers having an identification code. The method may also include receiving via a standby channel acknowledgement information from at least one of the plurality of recipient transceivers whose identification code is identical to the recipient identification code and transmitting via the primary channel voice data from the initiator transceiver to the at least one of the plurality of recipient transceivers whose identification code is identical to the recipient identification code.

These and other features and advantages of the embodiments of the invention will become apparent from the following detailed description, taken in conjunction with the accompanying drawings, which illustrate, by way of example the principles of the invention.

DETAILED DESCRIPTION OF THE PRESENTLY PREFERRED EMBODIMENTS

Devices and methods that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" in various places in the specification are not necessarily all referring to the same embodiment. Throughout the drawings, reference numbers are re-used to indicate correspondence between referenced elements. In addition, the first digit of each reference number may indicate the figure in which the element first appears.

Figure 1:
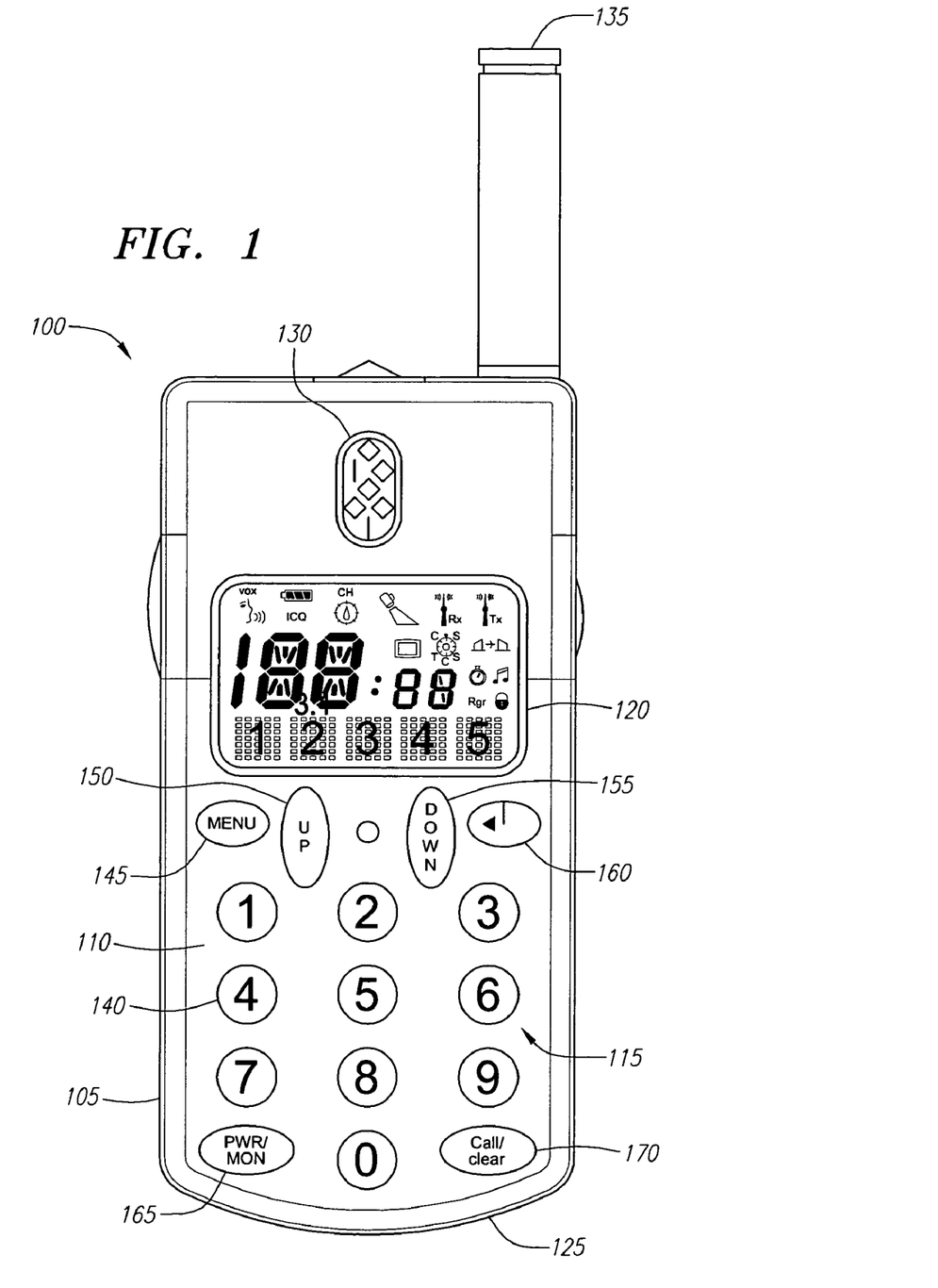
FIG. 1 is a front plan view of a transceiver for communicating with a number of other transceivers having substantially identical components, features and operations as the transceiver in accordance with an embodiment of the invention.

Referring now more particularly to the drawings, FIG. 1 is a front plan view of a transceiver 100 for communicating with a number of other transceivers having substantially identical components, features and operations as the transceiver 100. For illustrative purposes, the initiator transceiver may be referred to using the 100 numbers, the first recipient transceiver may be referred to using the 1100 numbers, the second recipient transceiver may be referred to using the 1200 numbers, etc. Furthermore, the term transceiver maybe used generically to refer to a transceiver that has not yet been assigned or designated as an initiator transceiver 100 or a recipient transceiver 1100. Each transceiver may have a unique 5-digit identification code stored in its memory. The 5-digit identification advantageously provides 99999 uniquely identifiable codes that can particularly identify 99999 specific transceivers or users.

In one embodiment, the transceiver 100 may include a housing 105 defining a cavity and having a front surface 110, a keypad 115, a display screen 120, a microphone 125, a speaker 130 and an antenna 135. The housing 105 maybe made of a plastic material or any other durable, light weight material. The keypad 115 may include a standard set of numeric values 140 (i.e., numbers ranging from 0 to 9), a menu button 145, an up button 150, a down button 155, a lock button 160, a power/channel monitor button 165 and a call/clear button 170. A user may press and hold down the power/monitor button 165 to turn the power on for the transceiver 100.

Figure 2:
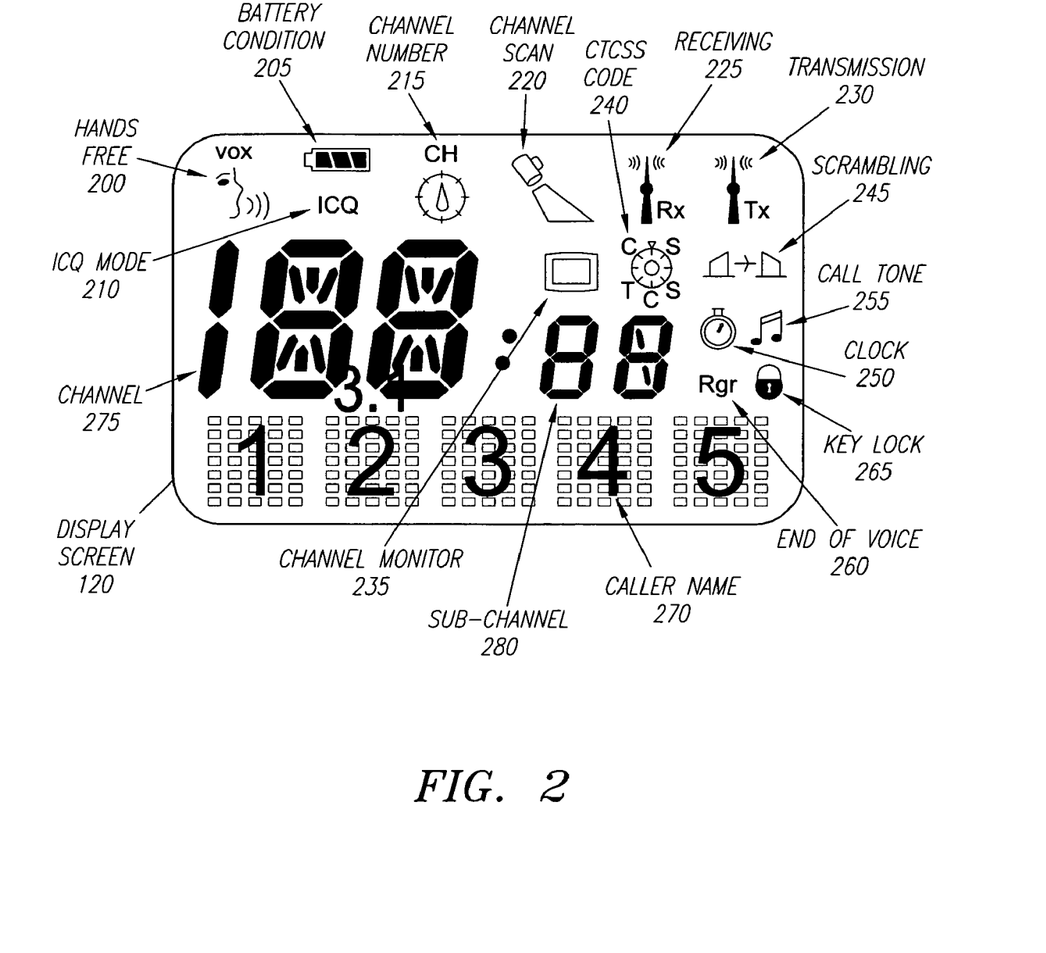
FIG. 2 is an exploded front plan view of the display screen of FIG. 1 in accordance with an embodiment of the invention.
Figure 3:
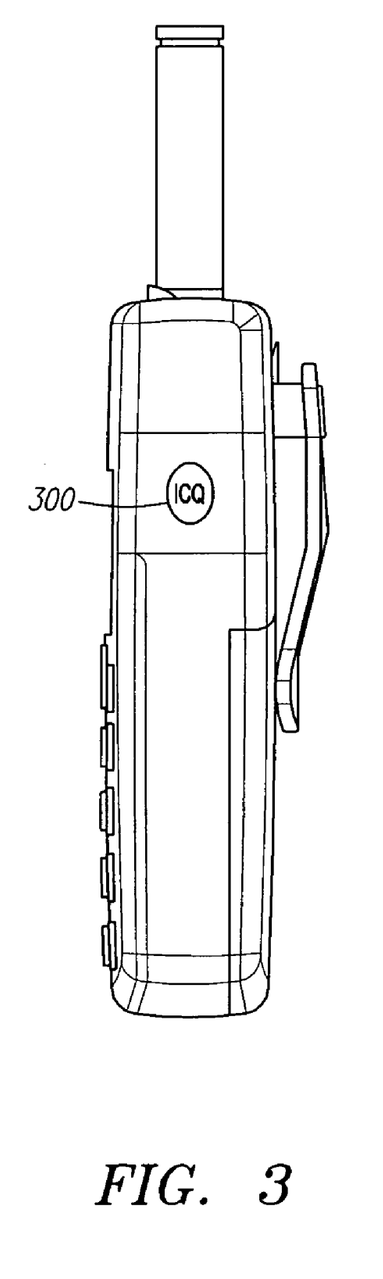
FIG. 3 is a right side view of the transceiver illustrating an ISeekU button in accordance with an embodiment of the invention.
Figure 4:
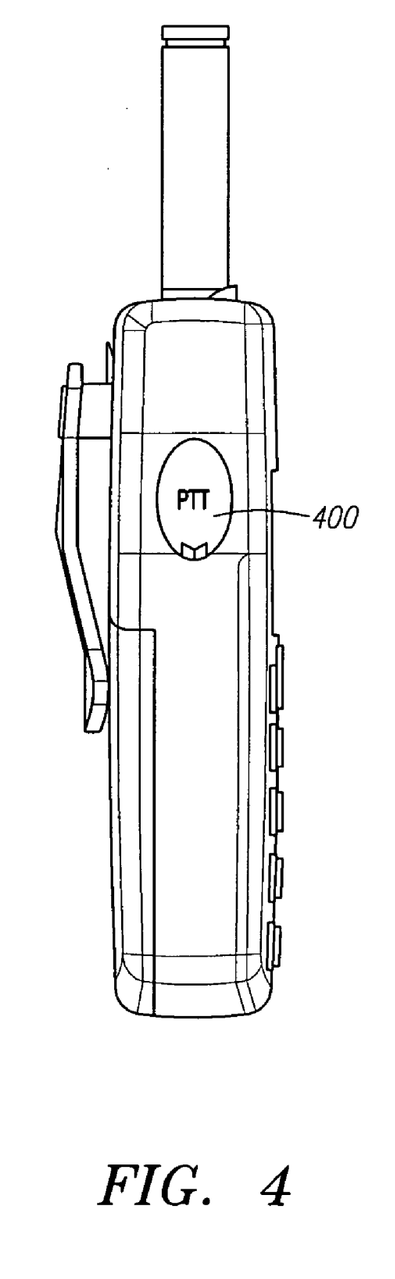
FIG. 4 is a left side view of the transceiver illustrating a PTT button in accordance with an embodiment of the invention.

FIG. 2 is an exploded front plan view of the display screen 120 of FIG. 1. In one embodiment, the display screen 120 may include a hands free icon 200, a battery level icon 205, an ISeekU mode icon 210, a channel number icon 215, a channel scan icon 220, a receiving information icon 225, a transmitting information icon 230, a channel monitor icon 235, a continuous tone-coded squelch system (CTCSS) icon 240, a scrambling icon 245, a clock icon 250, a call tone icon 255, an end of voice icon 260, a key lock icon 265, a caller name or number display area 270, a channel number 275 and a sub-channel number 280. FIG. 3 is a right side view of the transceiver 100 illustrating an ISeekU button 300. FIG. 4 is a left side view of the transceiver 100 illustrating a PTT button 400.

The transceiver 100 (sometimes referred to as a walkie-talkie) is a two-way half-duplex communication handheld device capable of operating under the General Mobile Radio Services (GMRS) of the FCC, which requires a radio license to operate in the United States. At any one time, the user may operate the transceiver 100 (i.e., transmit or receive signals) on one of the 22 channels, which may be selected from the 14 FRS channels or the 8 GMRS channels. The 22 channels may be shared by other FRS and GMRS users. In addition, the transceivers with the same CTCSS codes can communicate with each other. The CTCSS codes are generally programmed into each transceiver 100 at the manufacturing facility. In one embodiment, the CTCSS codes can be programmed into the transceivers by the user. An example of the CTCSS codes that can be programmed into each of the transceivers are listed in Table I below.

TABLE I

| Code | Frequency (MHz) |
|---|---|
| 1 | 67.0 |
| 2 | 71.9 |
| 3 | 74.4 |
| 4 | 77.0 |
| 5 | 79.7 |
| 6 | 82.5 |
| 7 | 85.4 |
| 8 | 88.5 |
| 9 | 91.5 |
| 10 | 94.8 |
| 11 | 97.4 |
| 12 | 100.0 |
| 13 | 103.5 |
| 14 | 107.2 |
| 15 | 110.9 |
| 16 | 114.8 |
| 17 | 118.8 |
| 18 | 123.0 |
| 19 | 127.3 |
| 20 | 131.8 |
| 21 | 136.5 |
| 22 | 141.3 |
| 23 | 146.2 |
| 24 | 151.4 |
| 25 | 156.7 |
| 26 | 162.2 |
| 27 | 167.9 |
| 28 | 173.8 |
| 29 | 179.9 |
| 30 | 186.2 |
| 31 | 192.8 |
| 32 | 203.5 |
| 33 | 210.7 |
| 34 | 218.1 |
| 35 | 225.7 |

TABLE I-continued

| Code | Frequency (MHz) |
| --- | --- |
| 36 | 233.6 |
| 37 | 241.8 |
| 38 | 250.3 |

Figure 5:
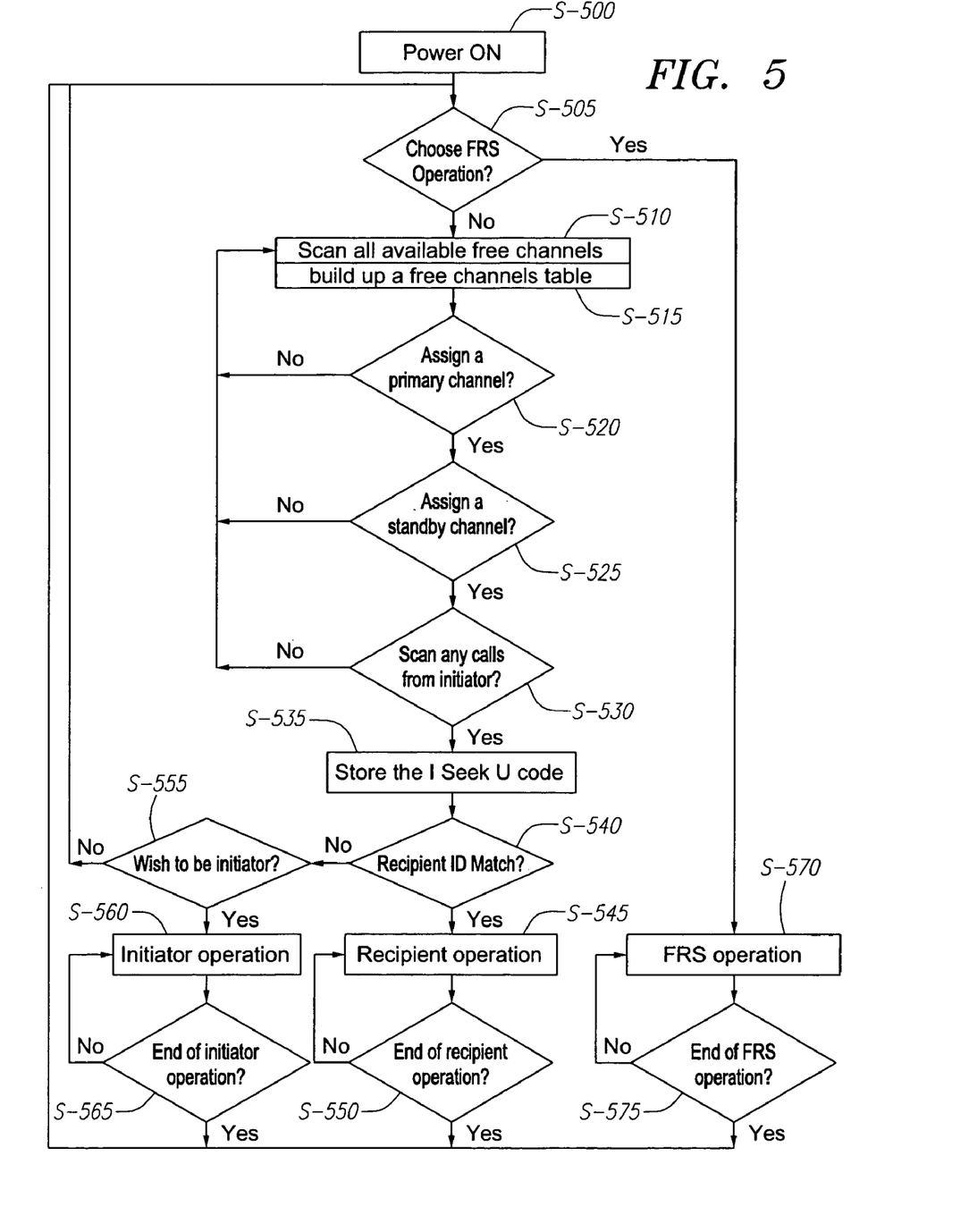
FIG. 5 is a flow chart illustrating a method of using the initiator transceiver to establish communication with the recipient transceivers via primary and standby channels.

FIG. 5 is a flow chart illustrating a method of using the initiator transceiver 100 to establish communication with the recipient transceivers 1100 via primary and standby channels. To begin, the transceivers are powered on by depressing and holding for a few seconds, each power button 165 (S-500). Once powered on, the user may choose to operate the transceiver 100 in a FRS mode or an ISeekU mode by toggling or depressing the ISeekU button 300, which illuminates the ISeekU mode icon 210 on the display screen 120 when the ISeekU mode has been selected (5-505). The FRS mode allows the transceiver 100 to operate in a manner similar to a conventional transceiver (S-570) until the transceiver is powered off or the ISeekU mode is selected by depressing the ISeekU button 300 (S-575).

The ISeekU mode allows the transceiver 100 to communicate with (i.e., receive and transmit information) one or more selected transceivers 1100 while preventing other transceivers in the area from participating in or listening to the communication. When the ISeekU mode is activated, the transceivers automatically scan all the existing channels (e.g., 22 channels) to identify the available or non-occupied channels at that particular moment (S-510) and create an available or free channel table listing all the available or non-occupied channels (S-515). Each transceiver creates its own available channel table, which is stored in its memory module. In one embodiment, the existing channel frequencies that are scanned are listed in Table II below.

TABLE II

| Channel | Frequency (MHz) |
| --- | --- |
| 1 | 462.5625 |
| 2 | 462.5875 |
| 3 | 462.6125 |
| 4 | 462.6375 |
| 5 | 462.6625 |
| 6 | 462.6875 |
| 7 | 462.7125 |
| 8 | 467.5625 |
| 9 | 467.5875 |
| 10 | 467.6125 |
| 11 | 467.6375 |
| 12 | 467.6625 |
| 13 | 467.6875 |
| 14 | 467.7125 |
| 15 | 462.5500 |
| 16 | 462.5750 |
| 17 | 462.6000 |
| 18 | 462.6250 |
| 19 | 462.6500 |
| 20 | 462.6750 |
| 21 | 462.7000 |
| 22 | 462.7250 |

To locate an available or non-occupied channel, the transceiver 100 scans each channel, one at a time, for the presence of any communication (e.g., a signal) or any interference on that channel. If communication or interference exists, then that particular channel is being used or occupied. If no communication or interference exists, then that particular channel is available or non-occupied. Once one or more available channels are located, the transceiver 100 stores the channel number(s) in its available channel table. After all the channels have been scanned, the transceiver 100 determines whether there are at least 2 available channels by checking its available channel table. In one embodiment, the transceiver 100 scans the channels until 2 available channels have been found and then stores the 2 channel numbers in the available channel table. Hence, all the channels may not need to be scanned. If less than 2 channel numbers are found or are present in the available channel table, then the transceiver 100 returns to S-510 to automatically rescans the channels to determine all the available channels at that particular moment.

Once at least 2 available channels have been identified, the transceiver 100 assigns or designates the lowest channel number in the available channel table as the primary channel (S-520) and the second lowest channel number in the available channel table as the standby channel (S-525). For example, if the available channel table includes channel numbers 5, 8, 12 and 13, channel number 5 will be designated as the primary channel and channel number 8 will be designated as the standby channel. The primary channel number may be displayed using the channel number icon 215 or the channel number 275. The primary channel and the standby channel can be a channel or a sub-channel. The transceiver 100 continuously updates (e.g., every 10 milliseconds) the available channel table.

Once the primary and standby channels have been designated, the user of any of the operational transceivers may initiate a call to another transceiver or group of transceivers. The transceiver that initiates the call is generally referred to as the initiator transceiver 100 and the transceiver(s) that receives the call is generally referred to as the recipient transceiver 1100. Initially, the user operating in the ISeekU mode may input using the keypad 115 or select from a menu using the up and down buttons 150, 155, the recipient identification code (or recipient identification name) of the recipient transceiver(s) to contact (S-530). For example, the user of the transceiver 100 may input 12345 and 67890 as the two recipient identification codes of the two recipient transceivers to contact. The two recipient identification codes are stored in the memory module of the initiator transceiver 100 (S-535). All other transceivers that do not have these recipient identification codes are prevented from participating in or listening to the communication. Once the recipient identification code(s) has been input or selected, the user of the initiator transceiver 100 may press the PTT button 400 to initiate communication with the recipient transceivers 1100, 1200. Specifically, the initiator transceiver 100 sends call initiate information 700 (see FIG. 7), which includes the recipient identification code(s), to an area defined by, for example, a 5 kilometer radius.

If the recipient identification code is substantially identical to or matches the identification code of any transceiver in the area around the initiator transceiver 100 (S-540), then the transceiver(s) is designated as the recipient transceiver(s) and operates as a recipient transceiver(s) (S-545) until the recipient operations have terminated (S-550). If the transceiver desires to operate as the initiator transceiver (S-555), then the transceiver is designated as the initiator transceiver 100 and operates as an initiator transceiver (S-560) until the initiator operations have terminated (S-565).

Figure 6:
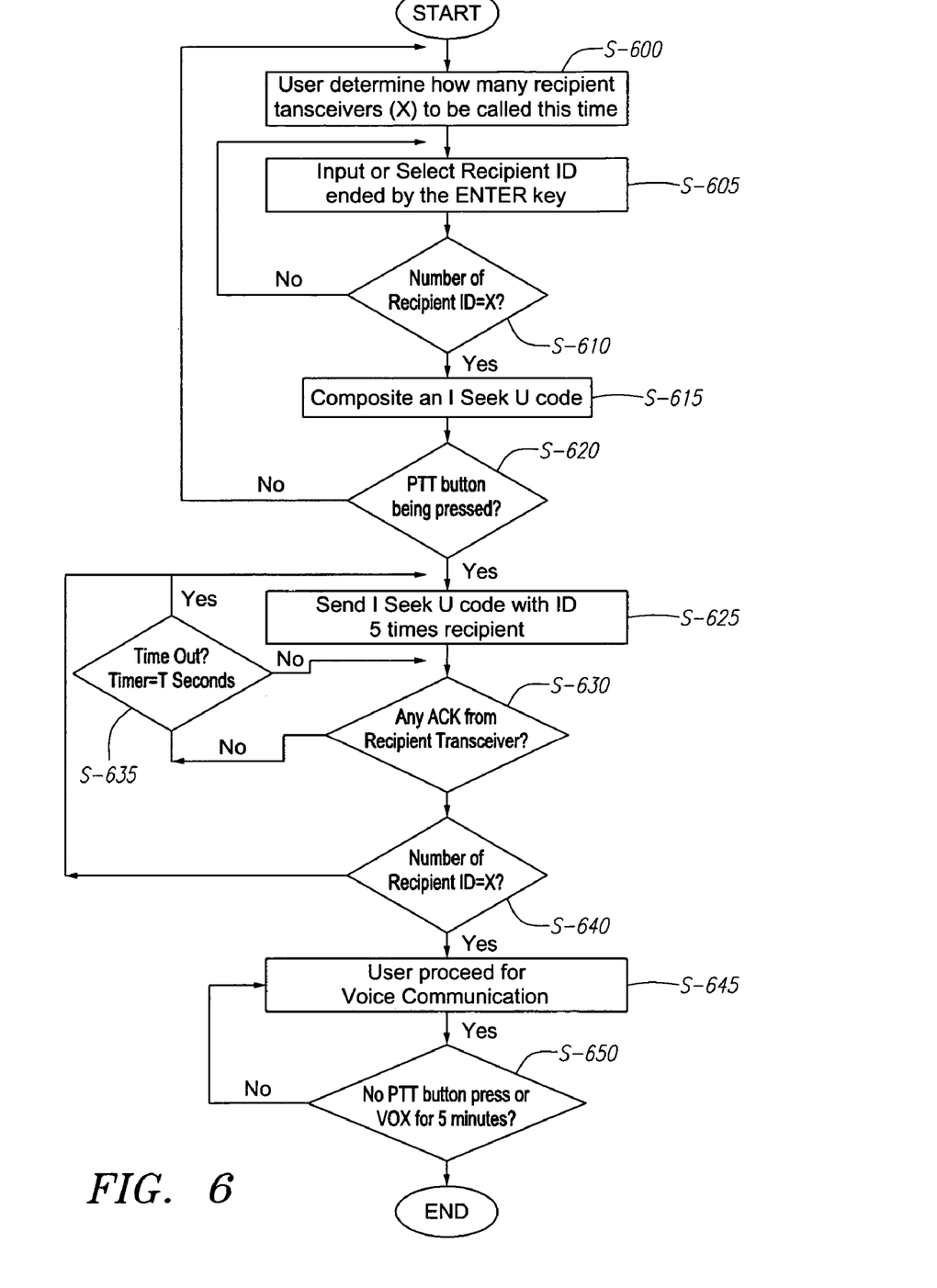
FIG. 6 is a flow chart illustrating the operations of the initiator transceiver in accordance with an embodiment of the invention.

FIG. 6 is a flow chart illustrating the operations of the initiator transceiver 100. Prior to inputting or selecting the recipient identification codes, the user of the initiator transceiver 100 may input using the keypad 115 the total number X (e.g., 2) of transceivers to call or contact (S-600). In one embodiment, the maximum number of transceivers that may be called is 4. Thereafter, the user may input using the keypad 115 or select from a menu using the up and down buttons 150, 155, the recipient identification code of the transceiver(s) to contact (S-605). In one embodiment, the user may input the recipient's name to be called and the initiator transceiver 100 will retrieve from the memory module the corresponding recipient identification code. After the recipient identification codes have been input, the user presses the call button 170 to indicate that all the recipient identification codes have been input. At S-610, if the user has not input the correct number of recipient identification codes as indicated in S-600, the user returns to S-605 and is prompted to input any additional recipient identification codes that may not have been entered. If the total number of transceivers to call as input in S-600 is equal to the total number of recipient identification codes as input in 605, then the initiator transceiver 100 creates or generates call initiate information (e.g., an ISeekU code) (S-615).

Figure 7:
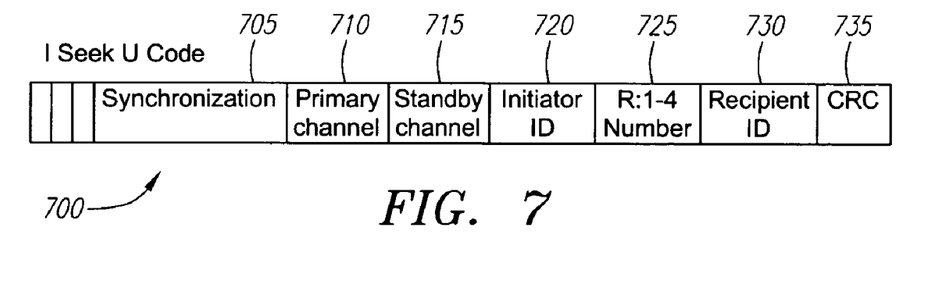
FIG. 7 is a simplified block diagram illustrating the call initiate information, which may include a synchronization code, a primary channel number, a standby channel number, an initiator identification code, a recipient number indicating the total number of recipients, a recipient identification code and an error checking code in accordance with an embodiment of the invention.

FIG. 7 is a simplified block diagram illustrating the call initiate information 700, which may include a synchronization code 705, a primary channel number 710, a standby channel number 715, a 5-digit initiator identification code 720, a recipient number 725 (e.g., 1, 2, 3 and 4), a 5-digit recipient identification code 730 (e.g., 11111, 22222, 33333 and 44444) corresponding to the recipient number 725 and an error checking code 735. When the user presses the PTT button 400 (S-620), the initiator transceiver 100 transmits the call initiate information 700 using the primary channel to an area defined by, for example, a 5 kilometer radius around the initiator transceiver 100 (S-625). Hence, the initiator transceiver 100 may simultaneously initiate a call to one or more (e.g., 4) recipient transceivers 1100. In one embodiment, the initiator transceiver 100 may transmit the call initiate information 700 to the area several time (e.g., 5 times) to ensure that all operational recipient transceivers 1100 within the area receive the call initiate information (S-625). The recipient transceivers 1100 that are within an area defined by, for example, the 5 kilometer radius of the initiator transceiver 100 may receive the call initiate information 700 from the initiator transceiver 100.

Figure 8:
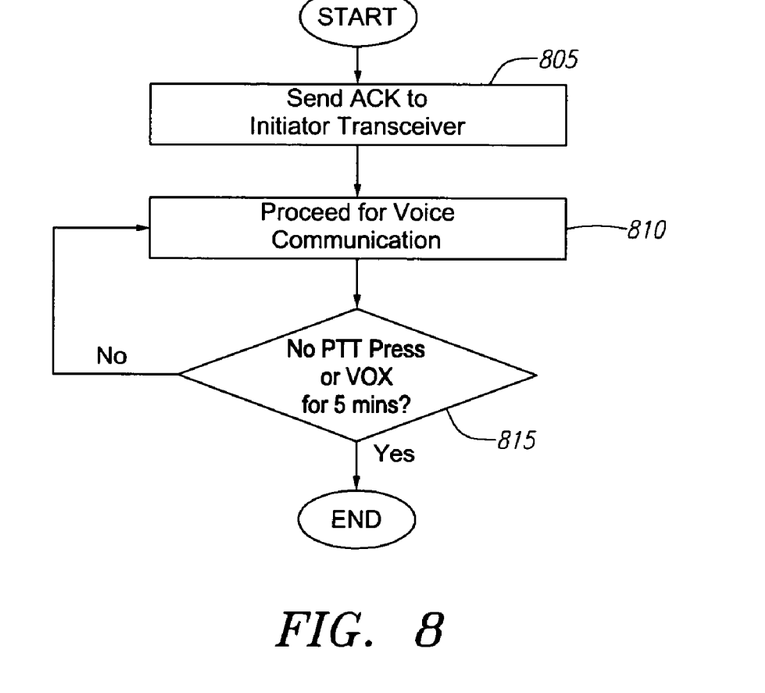
FIG. 8 is a flow chart illustrating the operations of the recipient transceivers in accordance with an embodiment of the invention.
Figure 9:
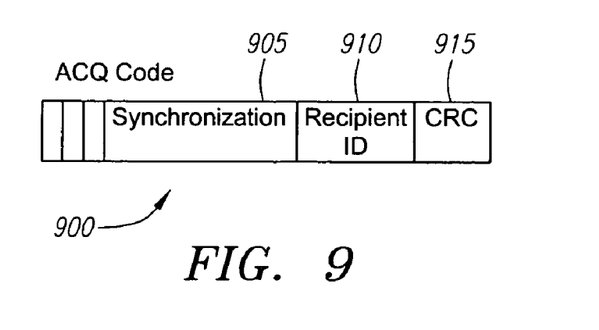
FIG. 9 is a simplified block diagram illustrating the acknowledgement information, which may include a synchronization code, a recipient identification code and an error checking code in accordance with an embodiment of the invention.

FIG. 8 is a flow chart illustrating the operations of the recipient transceivers 1100, 1200. The recipient transceivers 1100, 1200 that receive the call initiate information 700 determine whether their identification code is substantially identical to or matches the recipient identification code 730 received from the initiator transceiver 100. That is, each recipient transceiver 1100 compares its identification code with the recipient identification codes 730 contained in the call initiate information 700 and received from the initiator transceiver 100 to determine if there is a match. The recipient transceivers 1100 whose identification codes match one of the recipient identification codes 730 may transmit acknowledgement information 900 (e.g., an ACQ code), using the standby channel, to the initiator transceiver 100 (S-805). FIG. 9 is a simplified block diagram illustrating the acknowledgement information 900, which may include a synchronization code 905, a recipient identification code 910 and an error checking code 915.

Referring to FIG. 6, the initiator transceiver 100 may receive the acknowledgement information 900 from multiple (e.g., 4) recipient transceivers 1100, 1200, 1300, 1400 (S-630). In one embodiment, the recipient identification code (or recipient identification name) is displayed on the caller number display area 270 upon proper receipt of the acknowledgement information 900. In order to attenuate interferences caused by multiple recipient transceivers 1100 transmitting the acknowledgement information 900 at the same time, the recipient transceivers 1100 with the higher identification codes may execute random or pseudo-random delays of varying times before transmitting the acknowledgement information 900 to the initiator transceiver 100. For example, in one embodiment, the delay may be equal to 5 times its identification code.

The initiator transceiver 100 may have a time out function (e.g., timer=T seconds, e.g., 5 seconds) in case no recipient transceivers 1100 respond to the call initiate information 700 (S-635). After receipt of the acknowledgement information 900 from at least one recipient transceiver 1100, the initiator transceiver 100 determines whether the number of acknowledgements received from the recipient transceivers 1100 is equal to the number of recipient transceivers that were sent the call initiate information 700 (S-640). If the numbers are not equal, the initiator transceiver 100 may return to S-625 to resend the call initiate information 700 to the recipient transmitters 1100 in the area. If one or more of the recipient transceivers 1100 have sent the acknowledgement information 900 to the initiator transceiver 100, the users can proceed to voice communication over the primary channel by pressing the PTT button 400 and speaking into the microphone 125 (S-645). The initiator transceiver 100 may transmit voice data to and receive voice data from one or more recipient transceivers 1100. The initiator transceiver 100 is directly connected via a direct wireless connection at a specific frequency to one or more recipient transceivers 1100. Hence, no intermediate network such as a public switched telephone network is required to connect the initiator transceiver 100 to one or more recipient transceivers 1100. Furthermore, no local or long distance telephone charges apply for the direct connection.

During voice communications, the initiator transceiver 100 scrambles (encrypts or encodes) the voice data and the recipient transceiver 1100 descramble (decrypts or decodes) the voice data and vice versa. The scrambling and descrambling can be performed using conventional scrambling and descrambling techniques. This prevents other unauthorized transceivers from listening to the voice conversations. The scrambling icon 245 may be illuminated when the scrambling or descrambling is being performed. If the PTT button 400 is not pressed or no voice data is received for a certain time period (e.g., 5 minutes), then the initiator transceiver 100 terminates the direct connections with the specific recipient transceivers 1100 (S-650). For example, if one recipient transceiver 1400 does not communicate with the initiator transceiver 100 for a period of, for example 5 minutes, the initiator transceiver 100 may terminate its connection with that particular recipient transceiver 1400 or all the recipient transceivers.

Referring to FIG. 8, once the initiator transceiver 100 receives the acknowledgement information 900, the user of the recipient transceiver 1100 can proceed to voice communication over the primary channel by pressing the PTT button 400 and speaking into the microphone 125 (S-810). The recipient transceiver can scramble the voice data and the initiator transceiver can descramble the voice data. This prevents other unauthorized transceivers from listening to the voice conversations. If the PTT button 400 is not pressed or no voice data is received for a certain time period (e.g., 5 minutes), then the recipient transceiver 1100 may terminate the direct connection with the initiator transceiver 100 (S-815).

During voice communication between the initiator transceiver 100 and the recipient transceivers 1100, the primary channel may experience interference. Once interference is detected, the initiator transceiver 100 retrieves the standby channel number from its own available channel table, instructs the recipient transceiver 1100 via the primary channel to switch to the standby channel and switches to the standby channel. Now, the standby channel is designated as the primary channel and the initiator transceiver 100 automatically updates its available channel table (S-515) and designates the next higher channel as the standby channel. In one embodiment, the initiator transceiver 100 and the recipient transceivers 1100 are permitted to receive and transmit voice data as long as their PTT button 400 is depressed once every, for example 5 minutes, or voice data is received or transmitted at least once every, for example 5 minutes.

Figure 10:
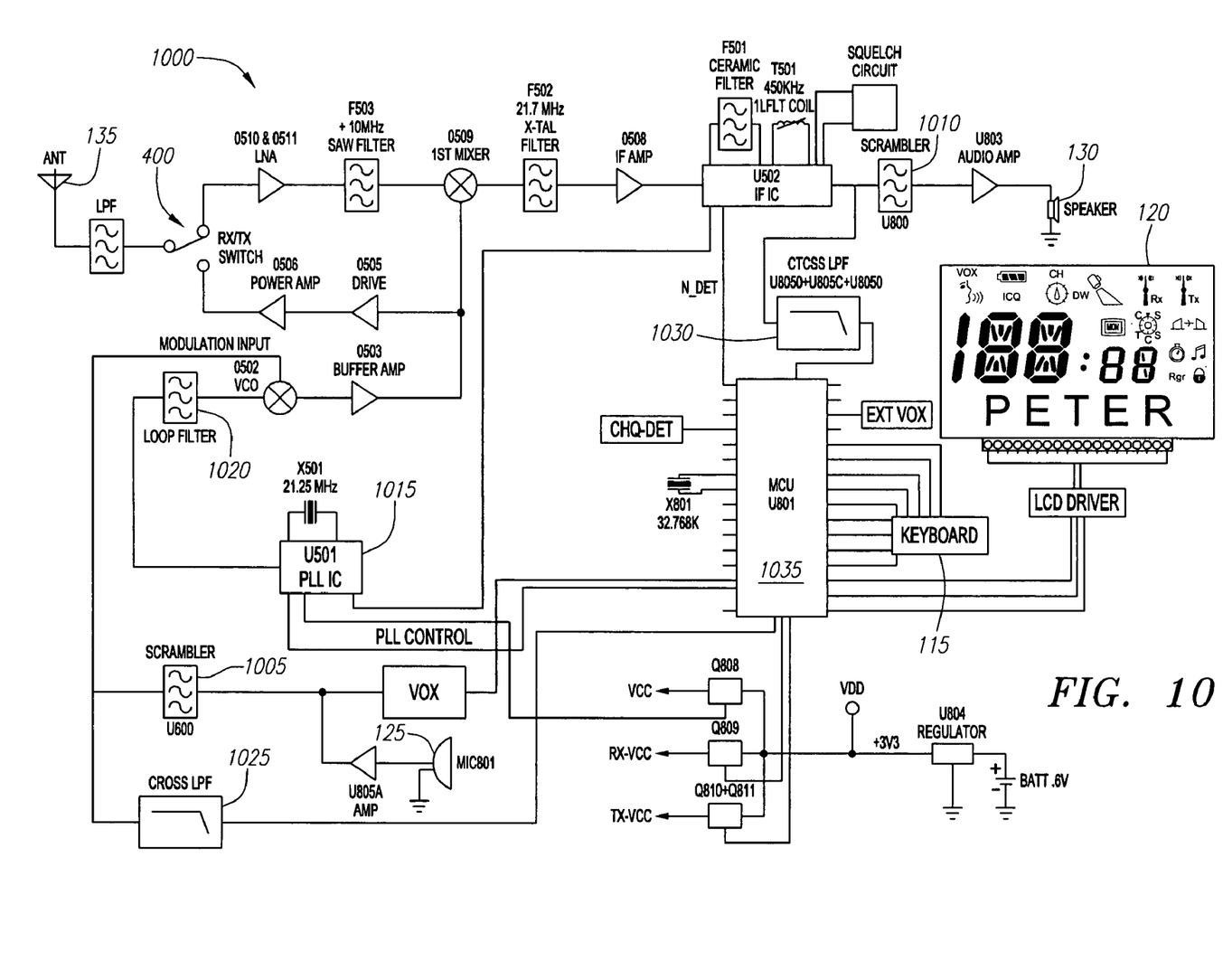
FIG. 10 is a schematic diagram of a circuit used in the transceiver for creating, receiving and transmitting the call initiate information, the acknowledgement information and the voice data and for scrambling and descrambling the voice data in accordance with an embodiment of the invention.

FIG. 10 is a schematic diagram of a control device 1000 (e.g., a circuit) located in the cavity of the transceiver for creating, receiving and transmitting the call initiate information 700, the acknowledgement information 900 and the voice data and for scrambling and descrambling the voice data. The control device 1000 can be implemented using hardware, software or a combination of the two. In one embodiment, the control device 1000 may include a scrambler 1005 for scrambling the outgoing voice data and a descrambler 1010 for descrambling the incoming scrambled voice data. The control device 1000 may also include a phase locked-loop controller 1015 for frequency synthesizing, a loop filter 1020 for removing all wanted frequencies, a CTCSS scrambler low pass filter 1025 for removing the high frequency components, a CTCSS decoder low pass filter 1030 for extracting the CTCSS coded frequencies, and a microprocessor 1035 for controlling the functions and operations of the transceiver 100, 1100.

Although an exemplary embodiment of the invention has been shown and described, many other changes, combinations, omissions, modifications and substitutions, in addition to those set forth in the above paragraphs, may be made by one having skill in the art without necessarily departing from the spirit and scope of this invention. Accordingly, the invention is not intended to be limited by the preferred embodiments, but is to be defined by reference to the appended claims.

What is claimed is:

1. A half-duplex communication device identified by an initiator identification code comprising:
    a control device to
        receive a first identification code and a second identification code stored in a memory,
        transmit the initiator identification code, the first identification code and the second identification code directly and without using an intermediate network to a plurality of transceivers, each transceiver identified by a unique transceiver identification code,
        receive first acknowledgment information from a first transceiver of the plurality of transceivers in response to the first transceiver determining that the first identification code matches the first transceiver's unique transceiver identification code, and
        receive second acknowledgment information form a second transceiver of the plurality of transceivers in response to the second transceiver determining that the second identification code matches the second transceiver's unique transceiver identification code,
        wherein the first acknowledgment information includes the first identification code and the second acknowledgment information includes the second identification code.

2. The communication device as defined in claim 1 wherein the control device has a direct wireless link to the first transceiver without the use of a telephone network.

3. The communication device as defined in claim 1 wherein the acknowledgement information includes the transceiver identification code.

4. The communication device as defined in claim 1 wherein the control device automatically scans a plurality of channels for an available channel.

5. The communication device as defined in claim 1 wherein the control device receives voice data, scrambles the voice data, and transmits the scrambled voice data to the first transceiver.

6. The communication device as defined in claim 5 wherein the transceiver descrambles the voice data.

7. The communication device as defined in claim 1 wherein the control device scans a plurality of channels for a signal or interference and designates an available channel as a primary channel and another available channel as a standby channel.

8. The communication device as defined in claim 7 wherein the control device creates an available channel table that includes a plurality of channel numbers representing the plurality of channels that did not have the signal or interference.

9. The communication device as defined in claim 1 wherein the initiator identification code is selected from a group consisting of a name or a number.

10. The communication device as defined in claim 1 wherein the transceiver identification code is selected from a group consisting of a name or a number.

11. A communication device identified by an initiator identification code comprising:
    a processor to
        receive a first identification code corresponding to a first transceiver and a second identification code corresponding to a second transceiver,
        automatically scan a plurality of channels for the presence of any communication or any interference to thereby identify available channels,
        create an available channel table,
        select, from the available channel table, an available primary channel and an available secondary channel not used for telephone communication,
        transmit via at least one of the available primary channel or the available secondary channel the initiator identification code, the first identification code and the second identification code to a plurality of transceivers including the first transceiver and the second transceiver, each transceiver having a unique transceiver identification code, and
        receive, from the first transceiver, a first acknowledgement information via at least one of the available primary channel or the available secondary channel in response to the first transceiver determining the first identification code matches its unique transceiver identification code, and
        receive, from the second transceiver, a second acknowledgement information via at least one of the available primary channel or the available secondary channel in response to the second transceiver determining the second identification code matches its unique transceiver identification code,
        wherein the first acknowledgement information includes the first identification code and the second acknowledgement information includes the second identification code.

12. The communication device as defined in claim 11 wherein the processor receives via the available secondary channel the transceiver identification code.

13. The communication device as defined in claim 11 wherein the processor has a direct wireless link to the at least one transceiver without the use of a telephone network.

14. The communication device as defined in claim 11 wherein the initiator identification code is selected from a group consisting of a name or a number.

15. The communication device as defined in claim 11 wherein the transceiver identification code is selected from a group consisting of a name or a number.

16. A system to provide half-duplex communication comprising:
  an initiator transceiver having an initiator identification code and configured to receive an a first transceiver identification code and a second transceiver identification code stored in a memory, automatically scan a plurality of channels for an available primary channel and an available secondary channel and transmit, using the available primary channel or the available secondary channel, the initiator identification code, the first transceiver identification code and the second transceiver identification code;
  a first recipient transceiver having a first recipient identification code and configured to receive the initiator identification code, the first transceiver identification code and the second transceiver identification code and automatically transmit, using one of the available primary or the secondary channels, the recipient identification code to the initiator transceiver when the first transceiver identification code matches the recipient identification code; and
  a second recipient transceiver having a second recipient identification code and configured to receive the initiator identification code, the first transceiver identification code and the second transceiver identification code and automatically transmit, using one of the available primary or the secondary channels, the second recipient identification code to the initiator transceiver when the second transceiver identification code matches the second recipient identification code.

17. The system as defined in claim 16 wherein the initiator transceiver has a direct wireless link to the recipient transceiver without the use of a telephone network.

18. The system as defined in claim 16 wherein the initiator transceiver transmits the initiator identification code and the recipient identification code directly to the first recipient transceiver without the use of an intermediate network.

19. The system as defined in claim 16 wherein the initiator transceiver and the first recipient transceiver operate using half-duplex communication.

20. The system as defined in claim 16 wherein the initiator transceiver and the first recipient transceiver include a scrambler for encoding voice data and a descrambler for decoding voice data.

21. The system as defined in claim 16 wherein the initiator transceiver automatically scans the plurality of channels for a signal or interference and designates the available channel as a primary channel and another available channel as a standby channel.

22. The system as defined in claim 21 wherein the initiator transceiver creates an available channel table that includes a plurality of channel numbers representing the plurality of channels that did not have the signal or interference.

23. The system as defined in claim 16 wherein the initiator identification code is selected from a group consisting of a name or a number.

24. The system as defined in claim 16 wherein the first transceiver identification code is selected from a group consisting of a name or a number.

* * * * *